(12) United States Patent
Krishan et al.

(10) Patent No.: US 11,709,725 B1
(45) Date of Patent: Jul. 25, 2023

(54) METHODS, SYSTEMS, AND COMPUTER READABLE MEDIA FOR HEALTH CHECKING INVOLVING COMMON APPLICATION PROGRAMMING INTERFACE FRAMEWORK

(71) Applicant: Oracle International Corporation, Redwood Shores, CA (US)

(72) Inventors: Rajiv Krishan, Bangalore (IN); Kiranmayi Boyapati, Bangalore (IN)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 0 days.

(21) Appl. No.: 17/579,077

(22) Filed: Jan. 19, 2022

(51) Int. Cl.
*G06F 11/07* (2006.01)
*G06F 9/54* (2006.01)
*G06F 11/30* (2006.01)
*G06F 16/955* (2019.01)

(52) U.S. Cl.
CPC .......... *G06F 11/0757* (2013.01); *G06F 9/547* (2013.01); *G06F 11/3055* (2013.01); *G06F 16/955* (2019.01)

(58) Field of Classification Search
CPC ............. G06F 11/0757; G06F 11/3055; G06F 16/955; G06F 9/547
See application file for complete search history.

(56) References Cited

U.S. PATENT DOCUMENTS

| 8,509,815 | B1 | 8/2013 | Shojayi et al. |
| 8,612,612 | B1 | 12/2013 | Dukes et al. |
| 8,793,396 | B2 | 7/2014 | Zhou et al. |
| 9,215,133 | B2 | 12/2015 | Baniel et al. |
| 10,277,637 | B2 | 4/2019 | Butala |
| 11,283,883 | B1 | 3/2022 | Krishan et al. |

(Continued)

FOREIGN PATENT DOCUMENTS

WO WO 2021/224545 A1 11/2021

OTHER PUBLICATIONS

"3rd Generation Partnership Project; Technical Specification Group Services and System Aspects; Functional architecture and information flows to support Common API Framework for 3GPP Northbound APIs; Stage 2 (Release 16)," 3GPP 23.222, V16.10.0, pp. 1-118 (Jun. 2021).

(Continued)

*Primary Examiner* — Nadeem Iqbal
(74) *Attorney, Agent, or Firm* — Jenkins, Wilson, Taylor & Hunt, PA

(57) ABSTRACT

Methods, systems, and computer readable media for health checking involving common application programming interface (API) framework (CAPIF) are disclosed. One example method for health checking using CAPIF comprises: at a CAPIF node including at least one processor: receiving, from a sender, a CAPIF request message including health check information usable in checking the health of an endpoint associated with the sender, wherein the health check information includes a uniform resource identifier (URI) associated with the endpoint and an acceptable response value for indicating that the endpoint is active; and determining, periodically or aperiodically, a health status of the endpoint by performing a health check procedure using the URI and the acceptable response value.

20 Claims, 8 Drawing Sheets

(56) References Cited

U.S. PATENT DOCUMENTS

| | | | |
|---|---|---|---|
| 11,303,731 | B2* | 4/2022 | Gupta .................. G06F 9/54 |
| 11,503,662 | B2 | 11/2022 | Tiwari et al. |
| 11,540,244 | B2 | 12/2022 | Ge et al. |
| 11,638,134 | B2 | 4/2023 | Krishan et al. |
| 2002/0036983 | A1 | 3/2002 | Widegren et al. |
| 2002/0068588 | A1 | 6/2002 | Yoshida et al. |
| 2003/0033394 | A1 | 2/2003 | Stine |
| 2003/0129980 | A1 | 7/2003 | Sayeedi |
| 2003/0219024 | A1 | 11/2003 | Purnadi et al. |
| 2004/0008661 | A1 | 1/2004 | Myles et al. |
| 2004/0062227 | A1 | 4/2004 | Sayeedi |
| 2005/0022115 | A1 | 1/2005 | Baumgartner et al. |
| 2005/0036463 | A1 | 2/2005 | Nesargi et al. |
| 2005/0053070 | A1 | 3/2005 | Jouppi |
| 2006/0104214 | A1 | 5/2006 | Borella |
| 2006/0203773 | A1 | 9/2006 | Georges et al. |
| 2007/0058585 | A1 | 3/2007 | Mudigonda et al. |
| 2007/0107047 | A1 | 5/2007 | Mukherjee et al. |
| 2007/0143483 | A1 | 6/2007 | Lim et al. |
| 2007/0249342 | A1 | 10/2007 | Huang et al. |
| 2007/0291678 | A1 | 12/2007 | Chowdhury et al. |
| 2008/0215888 | A1 | 9/2008 | Barriga et al. |
| 2009/0082049 | A1 | 3/2009 | Song et al. |
| 2009/0232310 | A1 | 9/2009 | Holtmanns et al. |
| 2010/0106845 | A1 | 4/2010 | Hu et al. |
| 2010/0286490 | A1 | 11/2010 | Koverzin |
| 2011/0138005 | A1 | 6/2011 | Zhou et al. |
| 2011/0165901 | A1 | 7/2011 | Baniel et al. |
| 2011/0320544 | A1 | 12/2011 | Yee et al. |
| 2012/0072585 | A1 | 3/2012 | Yang et al. |
| 2012/0099715 | A1 | 4/2012 | Ravishankar et al. |
| 2012/0221899 | A1 | 8/2012 | Cervenak et al. |
| 2013/0262308 | A1 | 10/2013 | Cai et al. |
| 2014/0010206 | A1 | 1/2014 | Bi et al. |
| 2014/0064124 | A1 | 3/2014 | Paladugu et al. |
| 2014/0086052 | A1 | 3/2014 | Cai et al. |
| 2014/0233368 | A1 | 8/2014 | Baniel et al. |
| 2014/0335815 | A1 | 11/2014 | Ephraim et al. |
| 2015/0236915 | A1 | 8/2015 | Mohammed et al. |
| 2017/0237781 | A1 | 8/2017 | Butala |
| 2019/0261260 | A1 | 8/2019 | Dao et al. |
| 2019/0357301 | A1 | 11/2019 | Li et al. |
| 2019/0372962 | A1 | 12/2019 | Maria et al. |
| 2020/0112907 | A1 | 4/2020 | Dao et al. |
| 2020/0145876 | A1 | 5/2020 | Dao et al. |
| 2020/0146077 | A1 | 5/2020 | Li et al. |
| 2020/0221541 | A1 | 7/2020 | Yan |
| 2020/0228420 | A1 | 7/2020 | Dao et al. |
| 2020/0229199 | A1 | 7/2020 | Xin et al. |
| 2020/0396649 | A1 | 12/2020 | Zong et al. |
| 2020/0396673 | A1 | 12/2020 | Tiwari et al. |
| 2021/0014141 | A1 | 1/2021 | Patil et al. |
| 2021/0037375 | A1 | 2/2021 | Cakulev et al. |
| 2021/0120408 | A1 | 4/2021 | Pazhyannur et al. |
| 2021/0144517 | A1 | 5/2021 | Guim Bernat et al. |
| 2021/0152470 | A1 | 5/2021 | Filsfils et al. |
| 2021/0168610 | A1 | 6/2021 | Adrangi et al. |
| 2021/0195506 | A1 | 6/2021 | Bartolome Rodrigo et al. |
| 2021/0212136 | A1 | 7/2021 | Lee et al. |
| 2021/0274392 | A1 | 9/2021 | Dao et al. |
| 2021/0321251 | A1 | 10/2021 | Colom Ikuno |
| 2021/0321466 | A1 | 10/2021 | Colom Ikuno |
| 2021/0360084 | A1 | 11/2021 | Song et al. |
| 2021/0385302 | A1 | 12/2021 | Cakulev et al. |
| 2021/0409942 | A1 | 12/2021 | De Kievit et al. |
| 2022/0022101 | A1 | 1/2022 | Wang et al. |
| 2022/0022102 | A1 | 1/2022 | Talat |
| 2022/0070702 | A1 | 3/2022 | Puente Pestana et al. |
| 2022/0086218 | A1 | 3/2022 | Sabella et al. |
| 2022/0104162 | A1 | 3/2022 | Aggarwal et al. |
| 2022/0174483 | A1 | 6/2022 | Tiwari et al. |
| 2022/0201085 | A1 | 6/2022 | Hu |
| 2022/0386225 | A1 | 12/2022 | Sapra et al. |
| 2023/0007456 | A1 | 1/2023 | Krishan et al. |
| 2023/0027164 | A1* | 1/2023 | Xu .................. H04L 41/0686 |

OTHER PUBLICATIONS

"3rd Generation Partnership Project; Technical Specification Group Core Network and Terminals; Common API Framework for 3GPP Northbound APIs; (Release 16)," 3GPP TS 29.222, V16.7.0, pp. 1-149 (Jun. 2021).

"3rd Generation Partnership Project; Technical Specification Group Core Network and Terminals; 5G System; Policy and Charging Control signaling flows and QoS parameter mapping; Stage 3 (Release 16)," 3GPP TS 29.513, V16.7.0, pp. 1-151 (Mar. 2021).

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

"3rd Generation Partnership Project; Technical Specification Group Core Network and Terminals; 5G System; Usage of the Unified Data Repository service for Policy Data, Application Data and Structured Data for Exposure; Stage 3 (Release 16)," 3GPP TS 29.519, V16.7.0, pp. 1-168 (Mar. 2021).

"3rd Generation Partnership Project; Technical Specification Group Core Network and Terminals; 5G System; Binding Support Management Service; Stage 3 (Release 16)," 3GPP TS 29.521, V16.7.0, pp. 1-37 (Mar. 2021).

"3rd Generation Partnership Project; Technical Specification Group Core Network and Terminals; 5G System; Spending Limit Control Service; Stage 3 (Release 16)," 3GPP TS 29.594, V16.5.0, pp. 1-43 (Mar. 2021).

"Common API Framework (CAPIF)," 3GPP, https://www.3gpp.org/common-api-framework-capif, pp. 1-4 (Sep. 30, 2019).

Non-Final Office Action for U.S. Appl. No. 17/367,196 (dated Aug. 18, 2022).

Commonly-Assigned, Co-pending U.S. Appl. No. 17/367,196 for "Methods, Systems, and Computer Readable Media for Resource Cleanup in Communications Networks," (Unpublished, filed Jul. 2, 2021).

Notice of Allowance and Fee(s) Due for U.S. Appl. No. 15/043,446 (dated Dec. 18, 2018).

Advisory Action Before the Filing of an Appeal Brief, Examiner-Initiated Interview Summary, and AFCP 2.0 Decision for U.S. Appl. No. 15/043,446 (dated Oct. 25, 2018).

Final Office Action and Applicant-Initiated Interview Summary for U.S. Appl. No. 15/043,446 (dated Jul. 25, 2018).

Non-Final Office Action for U.S. Appl. No. 15/043,446 (dated Dec. 20, 2017).

Notice of Allowance and Fee(s) Due for U.S. Appl. No. 13/772,286 (dated Aug. 10, 2015).

Non-Final Office Action for U.S. Appl. No. 13/772,286 (dated Dec. 18, 2014).

"3rd Generation Partnership Project; Technical Specification Group Core Network and Terminals; Policy and Charging Control over Rx reference point (Release 11)," 3GPP TS 29.214 V11.7.0, pp. 1-53 (Dec. 2012).

Fajardo et al., "Diameter Base Protocol," RFC 6733, pp. 1-152 (Oct. 2012).

"Digital cellular telecommunications system (Phase 2+); Universal Mobile Telecommunications System (UMTS); LTE; Policy and charging control: Spending limit reporting over Sy reference point (3GPP TS 29.219 version 11.2.0 Release 11)," ETSI TS 129 219 V11.2.0, pp. 1-22 (Oct. 2012).

Znaty, "Diameter, GPRS, (LTE + ePC = EPS), IMS, PCC and SDM," EFORT (May 2010). (Part 1 of 2, pp. 1-229).

Znaty, "Diameter, GPRS, (LTE + ePC = EPS), IMS, PCC and SDM," EFORT (May 2010). (Part 2 of 2, pp. 230-460).

Commonly-Assigned, Co-pending U.S. Appl. No. 17/541,230 for "Methods, Systems, and Computer Readable Media for Registering Application Functions Using Common Application Programming Interface Framework," (Unpublished, filed Dec. 2, 2021).

"3rd Generation Partnership Project; Technical Specification Group Core Network and Terminals; 5G System; Network Exposure Function Northbound APIs; Stage 3 (Release 16)," 3GPP TS 29.522, V16.9.0, pp. 1-185 (Sep. 2021).

(56) References Cited

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Core Network and Terminals; T8 reference point for Northbound APIs; (Release 16)," 3GPP TS 29.122, V16.11.0, pp. 1-408 (Sep. 2021).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

Non-Final Office Action for U.S. Appl. No. 17/541,230 (dated Jan. 19, 2023).

Notice of Allowance and Fee(s) Due and Examiner-Initiated Interview Summary for U.S. Appl. No. 17/367,196 (dated Dec. 16, 2022).

Notice of Allowance for U.S. Appl. No. 17/541,230 (dated May 10, 2023).

\* cited by examiner

300

| SERVICE API ID | HEALTH CHECK URI | MESSAGE TYPE | ACCEPTABLE RESPONSE VALUE | HEALTH STATUS | TIMESTAMP |
|---|---|---|---|---|---|
| 1 | HTTP_URI_1 | GET | 200 OK | ACTIVE | T1 |
| 2 | HTTP_URI_2 | GET | 204 NO CONTENT | ACTIVE | T1 |
| 3 | HTTP_URI_3 | PUT | 201 CREATED | INACTIVE | T2 |
| 4 | HTTP_URI_4 | PUT | 200 OK | INACTIVE | T3 |

FIG. 3

| ONBOARDING ID | HEALTH CHECK URI | MESSAGE TYPE | ACCEPTABLE RESPONSE VALUE | HEALTH STATUS | TIMESTAMP |
|---|---|---|---|---|---|
| 5 | HTTP_URI_5 | PUT | 100 CONTINUE | ACTIVE | T4 |
| 6 | HTTP_URI_6 | PUT | 200 OK | ACTIVE | T5 |
| 7 | HTTP_URI_7 | GET | 201 CREATED | ACTIVE | T6 |
| 8 | HTTP_URI_8 | GET | 200 OK | INACTIVE | T7 |

METHODS, SYSTEMS, AND COMPUTER READABLE MEDIA FOR HEALTH CHECKING INVOLVING COMMON APPLICATION PROGRAMMING INTERFACE FRAMEWORK

TECHNICAL FIELD

The subject matter described herein relates to improving communications in fifth generation (5G) and subsequent generation communications networks. More particularly, the subject matter described herein relates to methods, systems, and computer readable media for health checking involving common application programming interface (API) framework (CAPIF).

BACKGROUND

In telecommunications networks, a service endpoint is an address on a network node that uniquely identifies an entity that provides service to consumers. The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. An NF can be both a producer NF and a consumer NF depending on whether it is consuming or providing service.

A given producer NF may have many service endpoints. Producer NFs register with an NF repository function (NRF). The NRF maintains NF profiles (e.g., data types or data structures for storing information about NF instances) of available NF instances and their supported services. Consumer NFs can subscribe to receive information about producer NF instances that have registered with the NRF. Once registered, NF instances in the 5G network may establish sessions with one or more network exposure functions (NEFs). Notably, the NEF is a 3GPP network function that provides a means to securely expose the services and capabilities provided by producer network functions servicing the network.

SUMMARY

Methods, systems, and computer readable media for health checking involving common application programming interface (API) framework (CAPIF) are disclosed. One example method for health checking using CAPIF comprises: at a CAPIF node including at least one processor: receiving, from a sender, a CAPIF request message including health check information usable in checking the health of an endpoint associated with the sender, wherein the health check information includes a uniform resource identifier (URI) associated with the endpoint and an acceptable response value for indicating that the endpoint is active; and determining, periodically or aperiodically, a health status of the endpoint by performing a health check procedure using the URI and the acceptable response value.

One example system for health checking using CAPIF includes at least one processor, a memory, and a CAPIF node including the at least one processor and the memory. The CAPIF node is configured for: receiving, from a sender, a CAPIF request message including health check information usable in checking the health of an endpoint associated with the sender, wherein the health check information includes a uniform resource identifier (URI) associated with the endpoint and an acceptable response value for indicating that the endpoint is active; and determining, periodically or aperiodically, a health status of the endpoint by performing a health check procedure using the URI and the acceptable response value.

One example non-transitory computer readable medium comprising computer executable instructions embodied in the non-transitory computer readable medium that when executed by at least one processor of at least one computer cause the at least one computer to perform steps comprising: at a CAPIF node including at least one processor: receiving, from a sender, a CAPIF request message including health check information usable in checking the health of an endpoint associated with the sender, wherein the health check information includes a URI associated with the endpoint and an acceptable response value for indicating that the endpoint is active; and determining, periodically or aperiodically, a health status of the endpoint by performing a health check procedure using the URI and the acceptable response value.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 3 depicts example health related information associated with service providers or related endpoints;

FIG. 4 depicts example health related information associated with API invokers or related endpoints;

DETAILED DESCRIPTION

Figure 1:
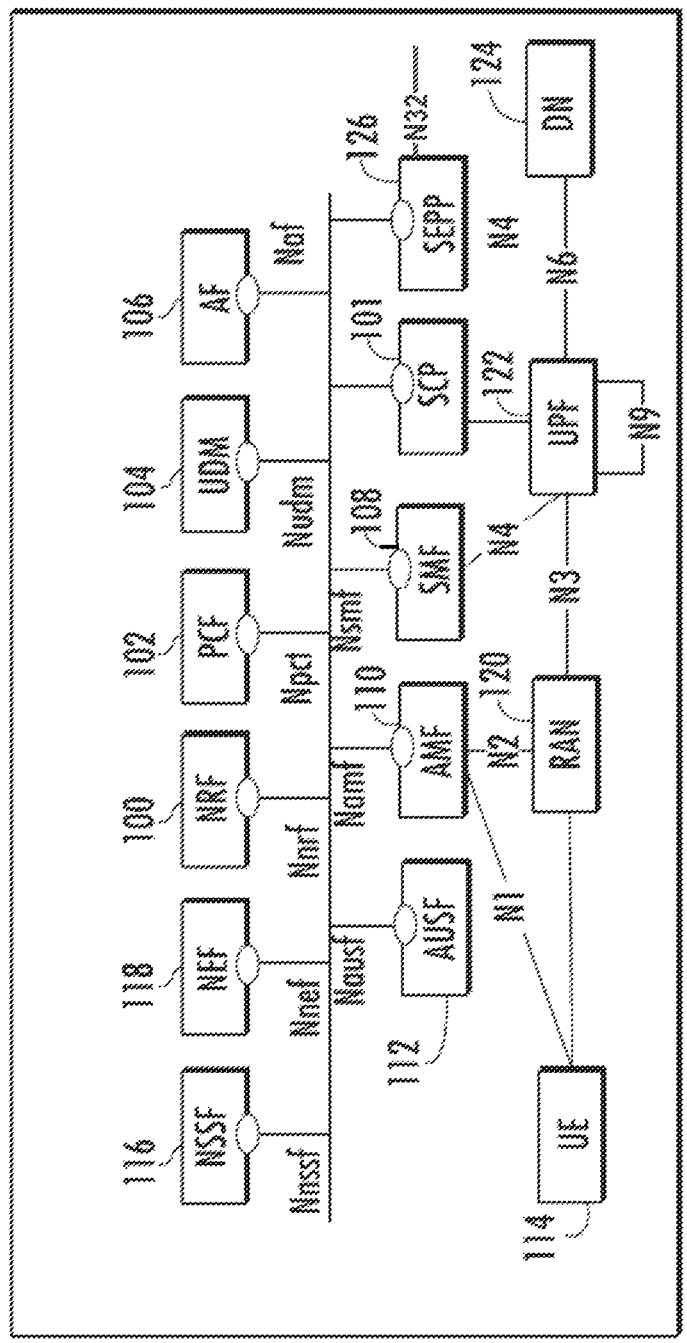
FIG. 1 is a network diagram illustrating an example fifth generation (5G) network architecture.

The subject matter described herein relates to methods, systems, and computer readable media for health checking involving common application programming interface (API) framework (CAPIF). The 3rd Generation Partnership Project (3GPP) defines a common application programming interface (API) framework (CAPIF) for 3GPP northbound APIs in 3GPP technical specification (TS) 23.222. As defined in 3GPP TS 23.222, the functional model for the CAPIF is arranged into functional entities, including an API invoker, a CAPIF core function (CCF), and an API exposing function (AEF), to describe a functional architecture for enabling access and invocation of service APIs. The API invoker represents an entity that uses or invokes a service or a related service API. For example, an API invoker may be an AF or other entity, such as an application requiring service from a service provider. The API invoker can discover service APIs from the CCF, request authorization for API invocations, and use the services provided by the AEF. The CCF represents a repository for service APIs, including PLMN and third party service APIs. The CCF can allow API invokers and an API exposing function (AEF) to discover service APIs, authenticate and authorize API invokers for usage of the service APIs, and perform logging and charging associated with related service API invocations. The AEF represents the provider of the services as APIs. The AEF can validate the authorization of an API invoker to use a service, provide the service to the API invoker, log related invocations on the CCF, and request charging for the service. Service providers (e.g., API publishers) can publish their APIs for use via CAPIF. API invokers can onboard (e.g., register) with the CCF and discover various service APIs. API invokers can also subscribe with the CCF for changes in availability of specific APIs.

While 3GPP TS 23.222 defines various operations associated with CAPIF, issues can arise when registered or onboarded API invokers are no longer available and/or when published service API endpoints are no longer available. For example, if a published service API endpoint or interface is down or unavailable, there may be little to no benefit for an API invoker to learn or discover the unavailable service API endpoint. In another example, if an endpoint associated with an onboarded API invoker or a published service API is down or unavailable, there may be little to no benefit for a CAPIF node to keep the unavailable endpoint registered indefinitely.

In accordance with some aspects of the subject matter described herein, methods, systems, mechanisms, and/or techniques for health checking using a CAPIF node are provided. For example, a CAPIF node (e.g., a device implementing a CCF and/or an AEF) in accordance with various aspects described herein may be configured for: receiving, from a sender (e.g., a service provider or an API invoker), a CAPIF request message including health check information usable in checking the health of an endpoint associated with the sender, wherein the health check information includes a uniform resource identifier (URI) associated with the endpoint and an acceptable response value for indicating that the endpoint is active; and determining, periodically or aperiodically, a health status of the endpoint by performing a health check procedure using the URI and the acceptable response value.

In accordance with some aspects of the subject matter described herein, methods, systems, mechanisms, and/or techniques for using information derived from or based on health checks in performing resource cleanup operations. For example, a CAPIF node in accordance with various aspects described herein may be configured for performing a resource cleanup procedure or operation, e.g., periodically (e.g., every 300 seconds) or aperiodically (e.g., when available CAPIF related memory is below a threshold value, like 10% left). In this example, the resource cleanup procedure or operation may delete and/or compress stale data records, e.g., data entries associated endpoints that have been marked or deemed "inactive" (e.g., unavailable) for a predetermined or configurable amount of time (e.g., 500 seconds).

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G system network architecture, e.g., a home 5G core (5GC) network. The architecture in FIG. 1 includes a network function (NF) repository function (NRF) 100 and a service communications proxy (SCP) 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in 3GPP TS 29.510. The NF or service profile definition includes at least one of a fully qualified domain name (FQDN), an IP version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs 126 usable for forwarding various communications (e.g., 5GC requests) between a consumer NF and a producer NF after applying application level security protection.

It will be appreciated that FIG. 1 is for illustrative purposes and that various nodes and/or modules, locations, and/or functionality described above in relation to FIG. 1 may be changed, altered, added, or removed.

Figure 2:
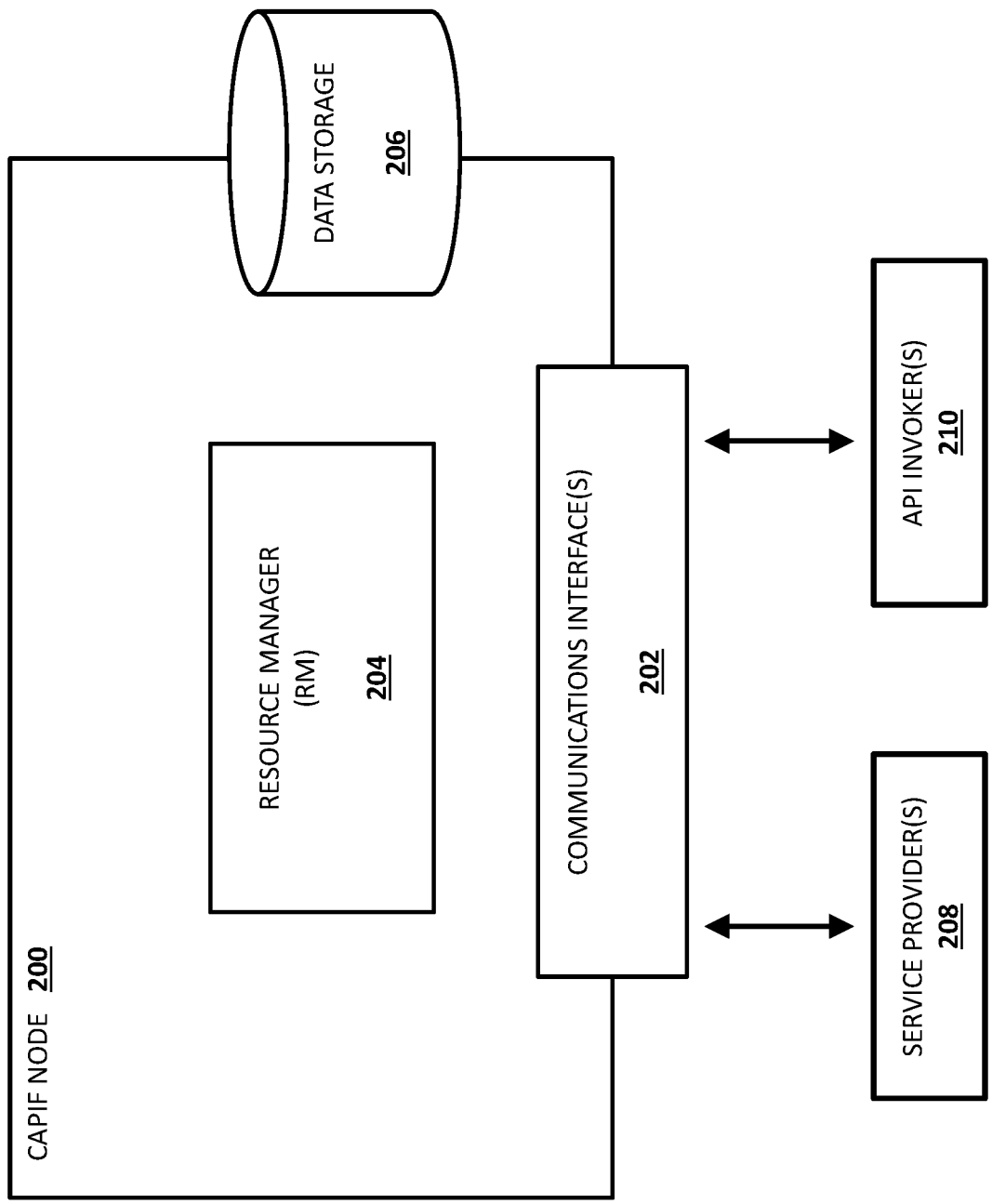
FIG. 2 is a block diagram illustrating an example common application programming interface (API) framework (CAPIF) node for health checking and/or resource cleanup.

FIG. 2 is a diagram illustrating an example CAPIF node 200 for health checking and/or resource cleanup. CAPIF node 200 may represent any suitable entity or entities (e.g., one or more node(s), device(s), or computing platform(s)) for performing various aspects or functionalities described herein, e.g., performing health checking or health related cleanup involving with one or more endpoints, e.g., associated with API invoker(s) 210 or service provider(s) 208. In some embodiments, CAPIF node 200 may include one or more 3GPP defined functions (e.g., a CCF or an AEF) and/or related functionality. In some embodiments, CAPIF node 200 may include an authorization server, a data repository, a network gateway, a network proxy, an edge security device, and/or other functionality.

In some embodiments, CAPIF node 200 may include a CCF or related functionality. For example, CAPIF node 200 may include or access a repository of PLMN and third party service APIs. In this example, API invoker(s) 210 (e.g., NFs like AFs 106 or applications thereof) and AEFs may use discovery procedures to identify relevant APIs in the repository. Continuing with this example, CAPIF node 200 may also authenticate and/or authorize API invoker(s) 210 to use one or more of the service APIs and may also log and charge for API invoker(s) 210.

In some embodiments, CAPIF node 200 may include an AEF or related functionality. For example, CAPIF node 200 may be the provider of various services as APIs. In this example, CAPIF node 200 may validate the authorization of API invoker(s) 210, provide a service to API invoker(s) 210, and log the invocations on the CCF and request charging for the service usage. In some embodiments, CAPIF node 200 or an AEF thereof may wrap around various 3GPP functions to enable APIs to be exposed. For example, NEF APIs can be exposed to the AEF with API invoker(s) 210 on top, which has access to the CCF for on-boarding and discovery and the availability of services provided by the AEF.

In some embodiments, CAPIF node 200 or a related entity may provide the capability to register or publish service APIs, e.g., usable by API invoker(s) 210 via an AEF. For example, service provider(s) 208 (e.g., NEF 116) may use an API (e.g., an CAPIF_Publish_Service_API API) to publish an API using an HTTP POST message. In this example, the payload of the HTTP POST message may include an API identifier (e.g., an API publishing function (APF) identifier (ApfId)) and other information, e.g., as defined in section 8.1 of 3GPP TS 29.222.

In some embodiments, CAPIF node 200 or a related entity may provide the capability to onboard or add new API invoker(s) 210, to support granting API invoker(s) 210's request(s) to onboard with an administrator, to support offboarding API invoker(s) 210, and/or to update an API invoker(s) 210's API list, e.g., after the discovery of new API(s). For example, when onboarding itself as an API invoker at CAPIF node 200, AF 106 may send an HTTP POST message (e.g., using an CAPIF_API_Invoker_Management_API API) to CAPIF node 200 or a CCF therein. In this example, the payload of the HTTP POST message may include an API invoker enrolment details object, an API list, and a notification destination URI. Various examples of onboarding information or related information is defined in section 8.4 of 3GPP TS 29.222.

In some embodiments, CAPIF node 200 or a related entity may provide or support an API (e.g., an CAPIF_Discover_Service_API API) to allow one or more API invoker(s) 210 (e.g., after onboarding) to discover various service APIs supported or registered by one or more service provider(s) 208 (e.g., as defined in section 8.1 of 3GPP TS 29.222). In such embodiments, API invoker(s) 210 may subscribe (e.g., an CAPIF_Events_API API) with CAPIF node 200 or a related entity to receive information regarding changes in availability of all or specific service APIs (e.g., by using API identifiers (e.g., ApfIds) provided by service provider(s) 208 during a publishing procedure). Various examples of subscription message information or notification message information is defined in section 8.3 of 3GPP TS 29.222.

Referring to FIG. 2, CAPIF node 200 may include one or more communications interface(s) 202 for communicating messages via a communications environment, e.g., one or more 5G networks. For example, communications interface(s) 202 may include one or more communications interfaces for communicating with various entities in a home network (e.g., home public land mobile network (H-PLMN)) or a visited network (e.g., a visited public land mobile network (V-PLMN)).

CAPIF node 200 may include a resource manager (RM) 204. RM 204 may be any suitable entity (e.g., software executing on at least one processor) for performing various operations associated health checking and/or resource cleanup. For example, RM 204 may be configured for receiving, from a sender, a CAPIF request message including health check information usable in checking the health of an endpoint associated with the sender (e.g., a uniform resource identifier (URI) identifying the endpoint and an acceptable response value for indicating that the endpoint is active) and determining, periodically or aperiodically, a health status of the endpoint, e.g., determining a health status may involve performing a health check procedure using the URI and the acceptable response value.

In some embodiments, RM 204 or another entity may determine that endpoint health checking is to be performed based on information provided during an API invoker onboarding process or during a service API registration process. For example, when registering one or more service APIs, service provider(s) 208 may include health check information (e.g., a health check URI and an acceptable response value) usable in checking the health of an endpoint associated with the sender) in a POST message or a registration related message. In another example, when onboarding, API invoker(s) 210 may include health check information in a POST message or a registration related message.

In some embodiments, health check information may be provided to RM 204 or another entity in one or more data elements or information elements (IEs). For example, health check information may be stored in a vendor-specific data structure (as defined in section 6.6.3 of TS 29.500) or a related element. An example of vendor-specific data indicating health check information is shown below:

"vendorSpecific-000111":{
  "version":1,
  "http_op":"GET",
  "http_url":"http://health.test.com/check",
  "http_response":200
}

In some embodiments, e.g., as depicted in the example above, health check information may include a version attribute, a message operation type (e.g., an hypertext transfer protocol (HTTP) operation type, like GET or PUT), an URI (e.g., an uniform resource locator (URL) indicating an FQDN or IP address, a port number, and/or a path, like http://health.test.com/check or http://health.test.com:678/check), and an acceptable response indicating health or availability (e.g., an HTTP response status code).

In some embodiments, since health check information is provided by service provider(s) 208 or API invoker(s) 210, health check related overhead may be effectively managed to minimize network issues or user experience issues for service provider(s) 208 or API invoker(s) 210. For example, service provider(s) 208 or an API invoker can specify an URI to use when performing health checks (e.g., an URI not providing or receiving a particular service). In this example, service provider(s) 208 or API invoker(s) 210 can choose to specify a non-signaling interface to handle health check messages from CAPIF node 200, while other interfaces (e.g., a notification destination URI) handle other types of requests and/or messages.

In some embodiments, CAPIF node 200, RM 204, or another entity may store received health check information and may use this information to perform one or more health checks, e.g., periodically (e.g., every 10 minutes) or aperiodically (e.g., when the network is congested/failed, or in response to detecting one or more multiple request failure reports associated with an API invoker or service provider, or when available storage at CAPIF node 200 is low) based on network operator settings or other factors. For example, RM 204 or another entity may be configured to use health check information for a particular endpoint (e.g., provided by API invoker(s) 210 or service provider(s) 208) to validate the health of the endpoint by sending a health check message (e.g., an HTTP GET message that matches a corresponding HTTP operation type indicated by the health check information) to a URI (e.g., an HTTP URL that matches a corresponding HTTP operation type indicated by the health check information). In this example, RM 204 or another entity may wait a predetermined amount of time for a response message and, if a response message is received, RM 204 or another entity may determine whether the response message includes an acceptable response (e.g., a response code that matches a corresponding acceptable response indicated by the health check information).

In some embodiments, CAPIF node 200, RM 204, or another entity may perform health checks only for endpoints that provide health check information. For example, service provider(s) 208 (e.g., an API publisher) may publish multiple API endpoints and may choose to provide health check information for all their API endpoints, some of their API endpoints, or none of their API endpoints. In this example, service provider(s) 208 can control whether CAPIF based health-checks are performed for each of their API endpoints. In another example, API invoker(s) 210 may register one or more endpoints and may choose to provide health check information for all their endpoints, some of their endpoints, or none of their endpoints. In this example, API invoker(s) 210 can control whether CAPIF based health-checks are performed for each of their endpoints.

In some embodiments, if health check information is not provided for an endpoint associated with service provider(s) 208 or API invoker(s) 210, CAPIF node 200, RM 204, or another entity may not perform health checks for that endpoint and may consider that endpoint to always be "active" (e.g., up and available).

In some embodiments, CAPIF node 200, RM 204, or another entity may store or indicate an "active" health status (e.g., in a data store or data storage 206) based on successful health checks performed using health check information. For example, CAPIF node 200, RM 204, or another entity may determine that an endpoint is "active" (e.g., healthy or available) when a response message is received during a health check process and the response message includes an acceptable response (e.g., when a received response code is the same as a response code indicated by corresponding health check information). In some embodiments, e.g., for every successful health check, a timestamp may be recorded along with the "active" health status.

In some embodiments, CAPIF node 200, RM 204, or another entity may store or indicate an "inactive" health status (e.g., in a data store or data storage 206) based on unsuccessful health checks performed using health check information. For example, CAPIF node 200, RM 204, or another entity may determine that an endpoint is "inactive" (e.g., unhealthy or unavailable) when a response message is not received during a health check process or when a response message does not include an acceptable response value (e.g., when a received response code is not the same as a response code indicated by corresponding health check information).

In some embodiments, when a health status associated with an endpoint changes from "active" to "inactive", a timestamp associated with the health status determination may be recorded along with the "inactive" health status. In such embodiments, an updated timestamp may not be recorded for a subsequent health checks if the health status remains "inactive". However, on a successful health check, an updated timestamp associated with the "active" health status determination may be recorded.

In some embodiments, CAPIF node 200, RM 204, or another entity may use health statuses or related information about endpoints when processing various requests and/or performing various actions. For example, in response to an API discovery request from API invoker(s) 210, CAPIF node 200, RM 204, or another entity may be configured to expose or provide "active" API endpoints (e.g., associated with a service API), but not to expose or provide "inactive" API endpoints based on stored health statuses (e.g., in data storage 206). In this example, CAPIF node 200, RM 204, or another entity may identify a group of potential APIs that match the request (e.g., based on request parameters such as an NF set, a locality, or an NF type), may then remove one or more APIs from the group of potential APIs if their corresponding health statuses indicate inactivity (e.g., unavailability), and may provide the remaining APIs (e.g., the "active" APIs) in an API discovery response message.

In some embodiments, CAPIF node 200, RM 204, or another entity may use health statuses or related information when providing notifications (e.g., about changing of availability of API endpoints) to subscribed API invoker(s) 210. For example, CAPIF node 200, RM 204, or another entity may be configured to notify subscribed API invoker(s) 210 about an API endpoint being available/unavailable (e.g., at or during runtime) based on health statuses or related information determined from performing health checks.

In some embodiments, CAPIF node 200, RM 204, or another entity may use health statuses or related information when performing resource cleanup. For example, CAPIF node 200, RM 204, or another entity may be configured to run or perform a resource cleanup procedure or operation, e.g., periodically (e.g., every 300 seconds) or aperiodically (e.g., when available CAPIF related memory is below a threshold value). In this example, the resource cleanup procedure or operation may delete and/or compress stale data records, e.g., data entries associated endpoints that have been marked or deemed "inactive" for a predetermined or configurable amount of time (e.g., 500 seconds).

In some embodiments, CAPIF node 200, RM 204, or another entity may utilize operator configurable settings, predetermined settings, and/or dynamic settings for performing health checks, resource cleanups, or other actions. For example, an operator may increase the amount of time that an endpoint must remain "inactive" to be considered "stale" and deletable for a resource cleanup procedure or operation. In this example, by increasing that amount of time, CAPIF node 200, RM 204, or another entity may delete less data records, thereby mitigating additional signaling messages or network congestion that could result from endpoints being removed prematurely and having to be onboarded or published again.

CAPIF node 200 and/or RM 204 may access (e.g., read from and/or write information to) data storage 206. Data storage 206 may be any suitable entity (e.g., a computer readable medium or memory) for storing various data. In some embodiments, data storage 206 may include a context data store for storing session information and/or other data, an API data store for storing API and/or endpoint information associated with service provider(s) 208 and health related information (e.g., health statuses derived from health checks and health check information provided by service provider(s) 208), an onboarding data store for storing endpoint information associated with API invoker(s) 210 and health related information (e.g., health statuses derived from health checks and health check information provided by API invoker(s) 210), various data stores comprising API information and/or authentication related information, and/or other information. In some embodiments, data storage 206 may include logic for performing various aspects associated with CAPIF node functions, CCF function, and/or AEF functions. In some embodiments, data storage 206 may include logic for performing health checks for one or more endpoints. In some embodiments, data storage 206 may include logic for performing a resource cleanup procedure or operation, e.g., deleting or clearing records associated with stale and/or "inactive" endpoints.

It will be appreciated that FIG. 2 and its related description are for illustrative purposes and that CAPIF node 200 may include additional and/or different modules, components, or functionality.

FIG. 3 depicts example health related information 300 associated with service provider(s) 208 or related endpoints.

Information 300 may include health check information (e.g., an health check message operation type, a URI for sending a health check message to, and an acceptable response value indicating that an endpoint is "active" (e.g., healthy or available)) usable for performing health checks associated with API endpoints associated with service provider(s) 208. Information 300 may include health statuses determined or derived from one or more health check procedures and timestamps indicating when the health check procedure was performed or completed.

In some embodiments, information 300 may be usable for determining when health checks should be initiated or triggered. For example, CAPIF node 200 or RM 204 therein may use respective timestamps and/or timers to periodically perform health checks for various endpoints. In this example, if CAPIF node 200 or RM 204 therein does not have access to appropriate health check information (e.g., an health check message operation type, a URI for sending a health check message to, and an acceptable response value) for some endpoints, CAPIF node 200 or RM 204 therein may not perform health checks on those endpoints.

In some embodiments, information 300 may be usable in performing resource cleanup. For example, CAPIF node 200 or RM 204 therein may use health statuses and timestamps to identify and delete stale records, e.g., records associated with endpoints that have been inactive for a configurable amount of time or longer (e.g., 5 minutes or longer).

Referring to FIG. 3, information 300 is depicted in a tabular format comprising columns and/or fields for a service API ID, a health check URI, a message type, an acceptable response value, a health status, and a timestamp. Each row may represent an endpoint associated with service provider(s) 208 (e.g., an API publisher) and corresponding health related information (e.g., health statuses, health check related timestamps, and health check information for performing health checks).

A "service API ID" field may store information for indicating or identifying a particular service provider 208 or a related endpoint associated with a service API. Example data in the "service API ID" field may include a unique identifier (e.g., an ApfId value as defined in 3GPP TS 29.222) for identifying or indicating a particular service API stored at CAPIF node 200.

A "health check URI" field may store information for communicating with an endpoint or a related entity when performing a health check for the endpoint. Example data in the "health check URI" field may include an HTTP URL or another URI and may include or indicate an FQDN or IP address, a port number, and/or a path, like http://health.test-.com/check or http://health.test.com:678/check).

A "message type" field may store information for indicating or identifying a particular message type or operation type for health check messages (e.g., usable to trigger a response from an endpoint or related entity). Example data in the "message type" field may include a value representing an HTTP operation type, e.g., GET, PUT, etc. In some embodiments, message type information may be different for different message protocols, e.g., if using non-HTTP messages for health check messages.

An "acceptable response value" field may store information for indicating or identifying when a corresponding endpoint is active, e.g., available or healthy. Example data in the "acceptable response value" field may include an HTTP response or status code (e.g., 200, 204, 100, or 201).

A "health status" field may store information for indicating or identifying a current or recent health or availability of an endpoint. Example data in the "health status" field may include a value for representing health in a binary form or a range of health or availability. For example, as depicted in FIG. 3, a health status may be represented by either an "active" or "inactive" status, where "active" may indicate that an endpoint is online, available, or healthy; and "inactive" may indicate that an endpoint is offline, unavailable, or unhealthy. In another example, a health status may be represent a value between 0 and 10. In this example, a health status of '0' may indicate that an endpoint is offline, unavailable, or unhealthy, a health status of '10' may indicate that an endpoint is online, available, or healthy with no congestion or detectable issues, and health statuses between '1' and '9' may indicate increasing degrees of health or availability for an endpoint.

A "timestamp" field may store information for indicating or identifying a time associated with a health status or a related health check. Example data in the "timestamp" field may include numbers in a predetermined or standard format for indicating a date and time associated with a health status, such as 'YYYYMMDDmmhhss' (e.g., '20211223050403' may indicate that a health status of a given endpoint was determined on Dec. 23, 2021 at 5:04:03 AM).

It will be appreciated that health related information 300 is for illustrative purposes and that different and/or additional data than the data depicted in FIG. 3 may be usable for tracking health statuses for service provider(s) 208 or related endpoints and/or usable for performing various related operations, e.g., resource cleanup involving service provider(s) 208 or related endpoints that are inactive for at least the last five minutes.

FIG. 4 depicts example health related information 400 associated with API invoker(s) 210 or related endpoints. Information 400 may include health check information (e.g., an health check message operation type, a health check URI for sending a health check message to, and an acceptable response value indicating that an endpoint is "active" (e.g., healthy or available)) usable for performing health checks associated with various endpoints associated with API invoker(s) 210. Information 400 may include health statuses determined or derived from one or more health check procedures and timestamps indicating when the health check procedure was performed or completed.

In some embodiments, information 400 may be usable for determining when health checks should be initiated or triggered. For example, CAPIF node 200 or RM 204 therein may use respective timestamps and/or timers to periodically perform health checks for various endpoints. In this example, if CAPIF node 200 or RM 204 therein does not access to have appropriate health check information (e.g., an health check message operation type, a URI for sending a health check message to, and an acceptable response value) for some endpoints, CAPIF node 200 or RM 204 therein may not perform health checks on those endpoints.

In some embodiments, information 400 may be usable in performing resource cleanup. For example, CAPIF node 200 or RM 204 therein may use health statuses and timestamps to identify and delete stale records, e.g., records associated with endpoints that have been inactive for a configurable amount of time or longer (e.g., 5 minutes or longer).

Referring to FIG. 4, information 400 is depicted in a tabular format comprising columns and/or fields for an onboarding ID, a health check URI, a message type, an acceptable response value, a health status, and a timestamp. Each row may represent an endpoint associated with API invoker(s) 210 and corresponding health related information (e.g., health statuses, health check related timestamps, and information for performing health checks).

An "onboarding ID" field may store information for indicating or identifying a particular API invoker 210 or a related endpoint. Example data in the "onboarding ID" field may include a unique identifier (e.g., an onboarding Id value as defined in 3GPP TS 29.222) for identifying or indicating an entity (e.g., an endpoint, an application, a node, etc.) that is successfully onboarded at or by CAPIF node 200.

A "health check URI" field may store information for communicating with an endpoint or a related entity when performing a health check for the endpoint. Example data in the "health check URI" field may include an HTTP URL or another URI and may include or indicate an FQDN or IP address, a port number, and/or a path, like http://health.test.com/check or http://health.test.com:678/check).

A "message type" field may store information for indicating or identifying a particular message type or operation type for health check messages (e.g., usable to trigger a response from an endpoint or related entity). Example data in the "message type" field may include a value representing an HTTP operation type, e.g., GET, PUT, etc. In some embodiments, message type information may be different for different message protocols, e.g., if using non-HTTP messages for health check messages.

An "acceptable response value" field may store information for indicating or identifying when a corresponding endpoint is active, e.g., available or healthy. Example data in the "acceptable response value" field may include an HTTP response code (e.g., 200, 204, or 201). A "health status" field may store information for indicating or identifying a current or recent health or availability of an endpoint. Example data in the "health status" field may include a value for representing health in a binary form or a range of health or availability. For example, as depicted in FIG. 4, a health status may be represented by either an "active" or "inactive" status, where "active" may indicate that an endpoint is online, available, or healthy; and "inactive" may indicate that an endpoint is offline, unavailable, or unhealthy. In another example, a health status may be represent a value between 0 and 10. In this example, a health status of '0' may indicate that an endpoint is offline, unavailable, or unhealthy, a health status of '10' may indicate that an endpoint is online, available, or healthy with no congestion or detectable issues, and health statuses between '1' and '9' may indicate increasing degrees of health or availability for an endpoint.

A "timestamp" field may store information for indicating or identifying a time associated with a health status or a related health check. Example data in the "timestamp" field may include numbers in a predetermined or standard format for indicating a date and time associated with a health status, such as 'YYYYMMDDmmhhss' (e.g., '20211224141413' may indicate that a health status of a given endpoint was determined on Dec. 24, 2021 at 2:14:13 PM).

It will be appreciated that health related data 400 is for illustrative purposes and that different and/or additional data than the data depicted in FIG. 4 may be usable for tracking health statuses for API invokers or related endpoints and/or usable for performing various related operations, e.g., resource cleanup involving API invoker(s) 210 or related endpoints that are inactive for at least the last five minutes.

Figure 5:
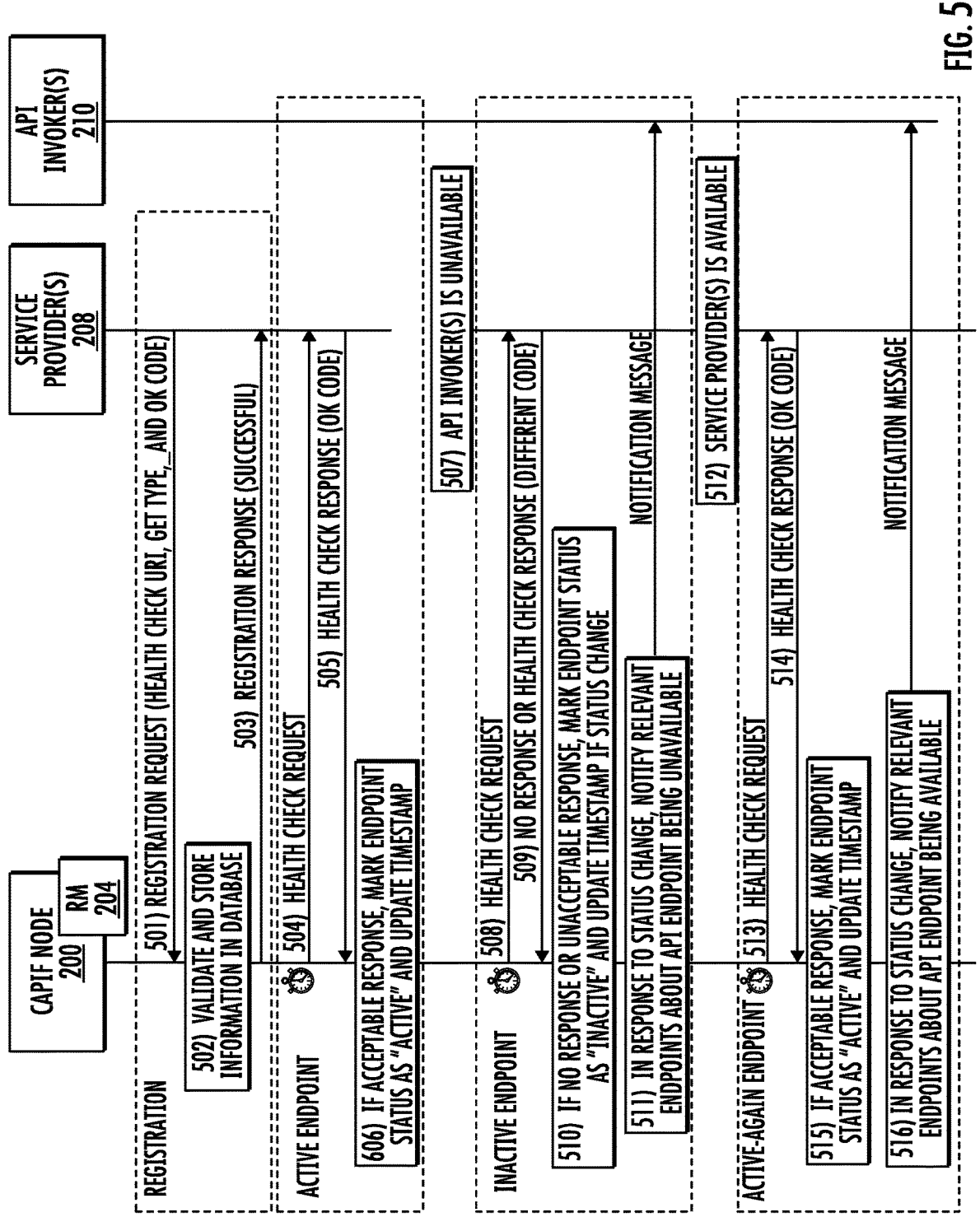
FIG. 5 is a message flow diagram illustrating various health checking operations associated with one or more service provider(s)

FIG. 5 is a message flow diagram illustrating various health checking operations associated with service provider(s) 208. In some embodiments, CAPIF node 200 or RM 204 therein may support one or more APIs (e.g., a CAPIF publish service API as defined in 3GPP TS 23.222) for publishing and managing published service APIs at CAPIF node 200 or a CCF therein. In some embodiments, e.g., during an API publishing or registration process, CAPIF node 200 or RM 204 therein may receive health check information from service provider(s) 208 usable for performing periodic or aperiodic health checks involving endpoints related to published service APIs. In some embodiments, e.g., after determining a health status change (e.g., a change in availability) of an endpoint based on a performed health check, CAPIF node 200 or RM 204 therein may send (e.g., via a CAPIF events API as defined in 3GPP TS 23.222) a notification message indicating a change in availability to one or more subscribed entities, e.g., API invoker(s) 210.

Referring to FIG. 5, (e.g., during an API publishing or registration process) in step 501, a registration request message (e.g., an HTTP POST message) for publishing a service API may be sent from service provider(s) 208 to CAPIF node 200. In some embodiments, the registration request message may comprise health check information (e.g., vendor-specific data indicating a health check URI for indicating an endpoint to send a health check message to, a health check message type, an acceptable response value (for indicating an "active" or "healthy" status), and/or other health check information).

In step 502, CAPIF node 200 or RM 204 therein may validate the registration request message and/or the sender (e.g., service provider(s) 208) and may store health check information and/or other registration related information in one or more data stores (e.g., in data storage 206).

In step 503, a registration response message (e.g., an HTTP POST message) indicating a successful registration or API publishing process may be sent from CAPIF node 200 to service provider(s) 208.

In step 504, e.g., based on a timer or other factors determined by a network operator or other entity, a health check message (e.g., an HTTP GET or PUT message) may be sent from CAPIF node 200 to an endpoint indicated by a URI, e.g., provided by service provider(s) 208 in step 501.

In step 505, a health check response message (e.g., an HTTP POST message) comprising an acceptable status code (indicating an "active" or healthy status) may be sent from the endpoint to CAPIF node 200.

In some embodiments, CAPIF node 200 or RM 204 therein may receive and analyze the health check response message to determine whether the message is an acceptable response (e.g., whether the response message includes a value indicating that the endpoint is active or healthy). For example, a health check determination may involve comparing an actual response value in a received health check response message to an acceptable response value provided by service provider(s) 208 in step 501. In this example, if the actual response value matches the acceptable response value then CAPIF node 200 or RM 204 therein may determine that the endpoint is "active" (e.g., healthy or available). Otherwise (e.g., if the actual response value does not match the acceptable response value), CAPIF node 200 or RM 204 therein may determine that the endpoint is "inactive" (e.g., unhealthy or unavailable).

In step 506, if the health check response indicates an "active" status, CAPIF node 200 or RM 204 therein may store the "active" status in one or more data stores (e.g., in data storage 206) and may store a timestamp associated with the health status or the related health check process.

In step 507, e.g., at some point in time after the previous health check involving the endpoint performed by CAPIF node 200, service provider(s) 208 may become unavailable (e.g., offline). For example, service provider(s) 208 or a related network may be down or having runtime issues.

In step 508, e.g., based on a timer or other factors determined by a network operator or other entity, a health check message (e.g., an HTTP GET or PUT message) may be sent from CAPIF node 200 to an endpoint indicated by a URI, e.g., provided by service provider(s) 208 in step 501.

In step 509, a health check response message (e.g., an HTTP POST message) comprising an unacceptable status code (indicating an "inactive" or unhealthy status) may be sent from the endpoint to CAPIF node 200 or a health response message may not be sent (e.g., within an acceptable time).

In some embodiments, CAPIF node 200 or RM 204 therein may receive and analyze the health check response message to determine whether the message is an acceptable response (e.g., whether the response message includes a value indicating that the endpoint is active or healthy). For example, a health check determination may involve comparing an actual response value in a received health check response message to an acceptable response value provided by service provider(s) 208 in step 501. In this example, if the actual response value matches the acceptable response value then CAPIF node 200 or RM 204 therein may determine that the endpoint is "active" (e.g., healthy or available). Otherwise (e.g., if the actual response value does not match the acceptable response value), CAPIF node 200 or RM 204 therein may determine that the endpoint is "inactive" (e.g., unhealthy or unavailable).

In some embodiments, CAPIF node 200 or RM 204 therein may check to see if a health check response message is received within an acceptable time period (e.g., configurable by a network operator or other entity). In such embodiments, if no response message is received within the acceptable time period, CAPIF node 200 or RM 204 therein may determine that the endpoint is "inactive" (e.g., unhealthy or unavailable).

In step 510, if the health check response indicates an "inactive" status, CAPIF node 200 or RM 204 therein may store the "inactive" status in one or more data stores (e.g., in data storage 206) and may store or update a timestamp associated with the health status or the related health check process. In some embodiments, a timestamp related to an "inactive" health status may only be stored for the endpoint when the most recent prior health status of the endpoint was "active" health status (the timestamp would not be updated again until a health check indicates the endpoint is determined to be "active" again). In such embodiments, the stored timestamp for the "inactive" endpoint would represent when the endpoint first became "inactive".

In step 511, in response to determining that an API or related endpoint is now "inactive", a notification message indicating this change in availability may be sent from CAPIF node 200 to subscribed entities, e.g., API invoker(s) 210. For example, CAPIF node 200, RM 204, or another entity may be configured to notify subscribed API invoker(s) 210 about an API endpoint being unavailable.

In step 512, e.g., at some point in time after the previous health check performed by CAPIF node 200, service provider(s) 208 may become available (e.g., online) again.

In step 513, e.g., based on a timer or other factors determined by a network operator or other entity, a health check message (e.g., an HTTP GET or PUT message) may be sent from CAP_IF node 200 to an endpoint indicated by a URI, e.g., provided by service provider(s) 208 in step 501.

In step 514, a health check response message (e.g., an HTTP POST message) comprising an acceptable status code (indicating an "active" or healthy status) may be sent from the endpoint to CAPIF node 200.

In some embodiments, CAPIF node 200 or RM 204 therein may receive and analyze the health check response message to determine whether the message is an acceptable response (e.g., whether the response message includes a value indicating that the endpoint is active or healthy). For example, a health check determination may involve comparing an actual response value in a received health check response message to an acceptable response value provided by service provider(s) 208 in step 501. In this example, if the actual response value matches the acceptable response value then CAPIF node 200 or RM 204 therein may determine that the endpoint is "active" (e.g., healthy or available). Otherwise (e.g., if the actual response value does not match the acceptable response value), CAPIF node 200 or RM 204 therein may determine that the endpoint is "inactive" (e.g., unhealthy or unavailable).

In step 515, if the health check response indicates an "active" status, CAPIF node 200 or RM 204 therein may store the "active" status in one or more data stores (e.g., in data storage 206) and may store a timestamp associated with the health status or the related health check process.

In step 516, in response to determining that an API or related endpoint is "active" again, a notification message indicating this change in availability may be sent from CAPIF node 200 to subscribed entities, e.g., API invoker(s) 210. For example, CAPIF node 200, RM 204, or another entity may be configured to notify subscribed API invoker(s) 210 about an API endpoint being available again.

It will be appreciated that FIG. 5 is for illustrative purposes and that different and/or additional messages may be communicated and/or actions may be performed. For example, while not shown, CAPIF node 200 or RM 204 therein may perform one or more resource cleanup procedures to remove information about endpoints that have been "inactive" for at least a particular amount of time. In this example, if an endpoint associated with service provider(s) 208 is removed, then subsequent health checks for that endpoint would not be performed, e.g., unless the API or related endpoint is reregistered or re-published. It will also be appreciated that various messages and/or actions described herein may occur in a different order or sequence.

Figure 6:
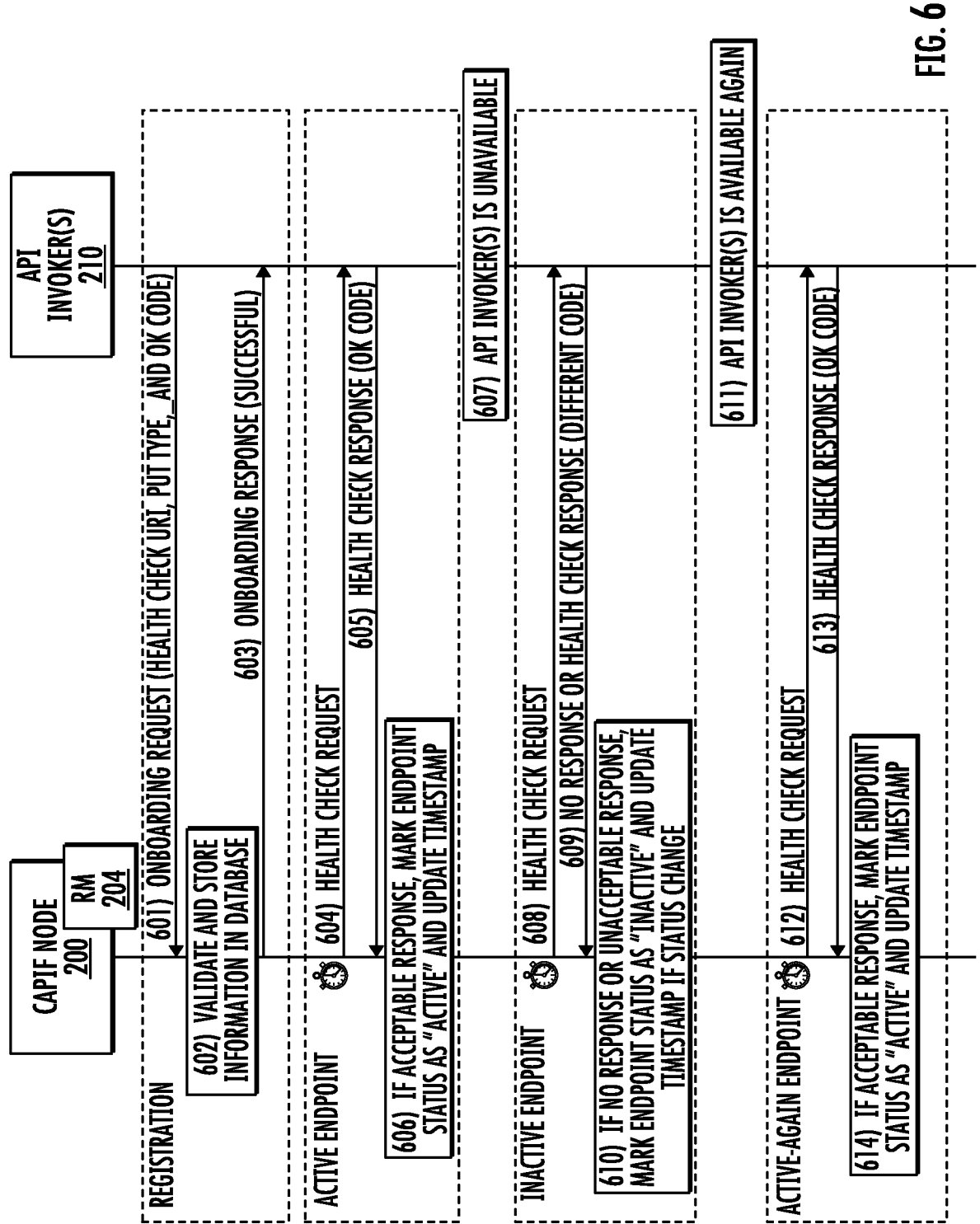
FIG. 6 is a message flow diagram illustrating various health checking operations associated with one or more API invoker(s)

FIG. 6 is a message flow diagram illustrating various health checking operations associated with API invoker(s) 210. In some embodiments, CAPIF node 200 or RM 204 therein may support one or more APIs (e.g., a CAPIF API invoker management API as defined in 3GPP TS 23.222) for managing API invoker(s) 210 at CAPIF node 200 or a CCF therein, e.g., onboarding, offboarding, updating API invoker details, etc. In some embodiments, e.g., during an onboarding or registration process, CAPIF node 200 or RM 204 therein may receive health check information from API invoker(s) 210 usable for performing periodic or aperiodic health checks involving endpoints related to API invoker(s) 210. Referring to FIG. 6, (e.g., during an onboarding or registration process) in step 601, an onboarding request message (e.g., an HTTP POST message) for onboarding or registering an endpoint associated with API invoker(s) 210 may be sent from API invoker(s) 210 to CAPIF node 200. In some embodiments, the onboarding request message may comprise health check information (e.g., vendor-specific data indicating a health check URI for indicating an endpoint to send a health check message to, a health check message type, an acceptable response value (for indicating an "active" or "healthy" status), and/or other health check information).

In step 602, CAPIF node 200 or RM 204 therein may validate the onboarding request message and/or the sender (e.g., API invoker(s) 210) and may store health check information and/or other onboarding related information in one or more data stores (e.g., in data storage 206).

In step 603, an onboarding response message (e.g., an HTTP POST message) indicating a successful onboarding process may be sent from CAPIF node 200 to API invoker(s) 210.

In step 604, e.g., based on a timer or other factors determined by a network operator or other entity, a health check message (e.g., an HTTP GET or PUT message) may be sent from CAPIF node 200 to an endpoint indicated by a URI, e.g., provided by API invoker(s) 210 in step 601.

In step 605, a health check response message (e.g., an HTTP POST message) comprising an acceptable status code (indicating an "active" or healthy status) may be sent from the endpoint to CAPIF node 200.

In some embodiments, CAPIF node 200 or RM 204 therein may receive and analyze the health check response message to determine whether the message is an acceptable response (e.g., whether the response message includes a value indicating that the endpoint is active or healthy). For example, a health check determination may involve comparing an actual response value in a received health check response message to an acceptable response value provided by API invoker(s) 210 in step 601. In this example, if the actual response value matches the acceptable response value then CAPIF node 200 or RM 204 therein may determine that the endpoint is "active" (e.g., healthy or available). Otherwise (e.g., if the actual response value does not match the acceptable response value), CAPIF node 200 or RM 204 therein may determine that the endpoint is "inactive" (e.g., unhealthy or unavailable).

In step 606, if the health check response indicates an "active" status, CAPIF node 200 or RM 204 therein may store the "active" status in one or more data stores (e.g., in data storage 206) and may store a timestamp associated with the health status or the related health check process. In step 607, e.g., at some point in time after the previous health check involving the endpoint performed by CAPIF node 200, API invoker(s) 210 may become unavailable (e.g., offline).

In step 608, e.g., based on a timer or other factors determined by a network operator or other entity, a health check message (e.g., an HTTP GET or PUT message) may be sent from CAPIF node 200 to an endpoint indicated by a URI, e.g., provided by API invoker(s) 210 in step 601.

In step 609, a health check response message (e.g., an HTTP POST message) comprising an unacceptable status code (indicating an "inactive" or unhealthy status) may be sent from the endpoint to CAPIF node 200 or a health response message may not be sent (e.g., within an acceptable time).

In some embodiments, CAPIF node 200 or RM 204 therein may receive and analyze the health check response message to determine whether the message is an acceptable response (e.g., whether the response message includes a value indicating that the endpoint is active or healthy). For example, a health check determination may involve comparing an actual response value in a received health check response message to an acceptable response value provided by API invoker(s) 210 in step 601. In this example, if the actual response value matches the acceptable response value then CAPIF node 200 or RM 204 therein may determine that the endpoint is "active" (e.g., healthy or available). Otherwise (e.g., if the actual response value does not match the acceptable response value), CAPIF node 200 or RM 204 therein may determine that the endpoint is "inactive" (e.g., unhealthy or unavailable).

In some embodiments, CAPIF node 200 or RM 204 therein may check to see if a health check response message is received within an acceptable time period (e.g., configurable by a network operator or other entity). In such embodiments, if no response message is received within the acceptable time period, CAPIF node 200 or RM 204 therein may determine that the endpoint is "inactive" (e.g., unhealthy or unavailable).

In step 610, if the health check response indicates an "inactive" status, CAPIF node 200 or RM 204 therein may store the "inactive" status in one or more data stores (e.g., in data storage 206) and may store or update a timestamp associated with the health status or the related health check process. In some embodiments, a timestamp related to an "inactive" health status may only be stored for the endpoint when the most recent prior health status of the endpoint was "active" health status (the timestamp would not be updated again until a health check indicates the endpoint is determined to be "active" again). In such embodiments, the stored timestamp for the "inactive" endpoint would represent when the endpoint first became "inactive".

In step 611, e.g., at some point in time after the previous health check performed by CAPIF node 200, API invoker(s) 210 may become available (e.g., online) again.

In step 612, e.g., based on a timer or other factors determined by a network operator or other entity, a health check message (e.g., an HTTP GET or PUT message) may be sent from CAPIF node 200 to an endpoint indicated by a URI, e.g., provided by API invoker(s) 210 in step 601.

In step 613, a health check response message (e.g., an HTTP POST message) comprising an acceptable status code (indicating an "active" or healthy status) may be sent from the endpoint to CAPIF node 200.

In some embodiments, CAPIF node 200 or RM 204 therein may receive and analyze the health check response message to determine whether the message is an acceptable response (e.g., whether the response message includes a value indicating that the endpoint is active or healthy). For example, a health check determination may involve comparing an actual response value in a received health check response message to an acceptable response value provided by API invoker(s) 210 in step 601. In this example, if the actual response value matches the acceptable response value then CAPIF node 200 or RM 204 therein may determine that the endpoint is "active" (e.g., healthy or available). Otherwise (e.g., if the actual response value does not match the acceptable response value), CAPIF node 200 or RM 204 therein may determine that the endpoint is "inactive" (e.g., unhealthy or unavailable).

In step 614, if the health check response indicates an "active" status, CAPIF node 200 or RM 204 therein may store the "active" status in one or more data stores (e.g., in data storage 206) and may store a timestamp associated with the health status or the related health check process.

It will be appreciated that FIG. 6 is for illustrative purposes and that different and/or additional messages may be communicated and/or actions may be performed. For example, while not shown in FIG. 6, CAPIF node 200 or RM 204 therein may perform one or more resource cleanup procedures to remove information about endpoints that have been "inactive" for at least a particular amount of time. In this example, if an endpoint associated with API invoker(s) 210 is removed, then subsequent health checks for that endpoint would not be performed, e.g., unless the endpoint is reregistered or re-onboarded. It will also be appreciated that various messages and/or actions described herein may occur in a different order or sequence.

Figure 7:
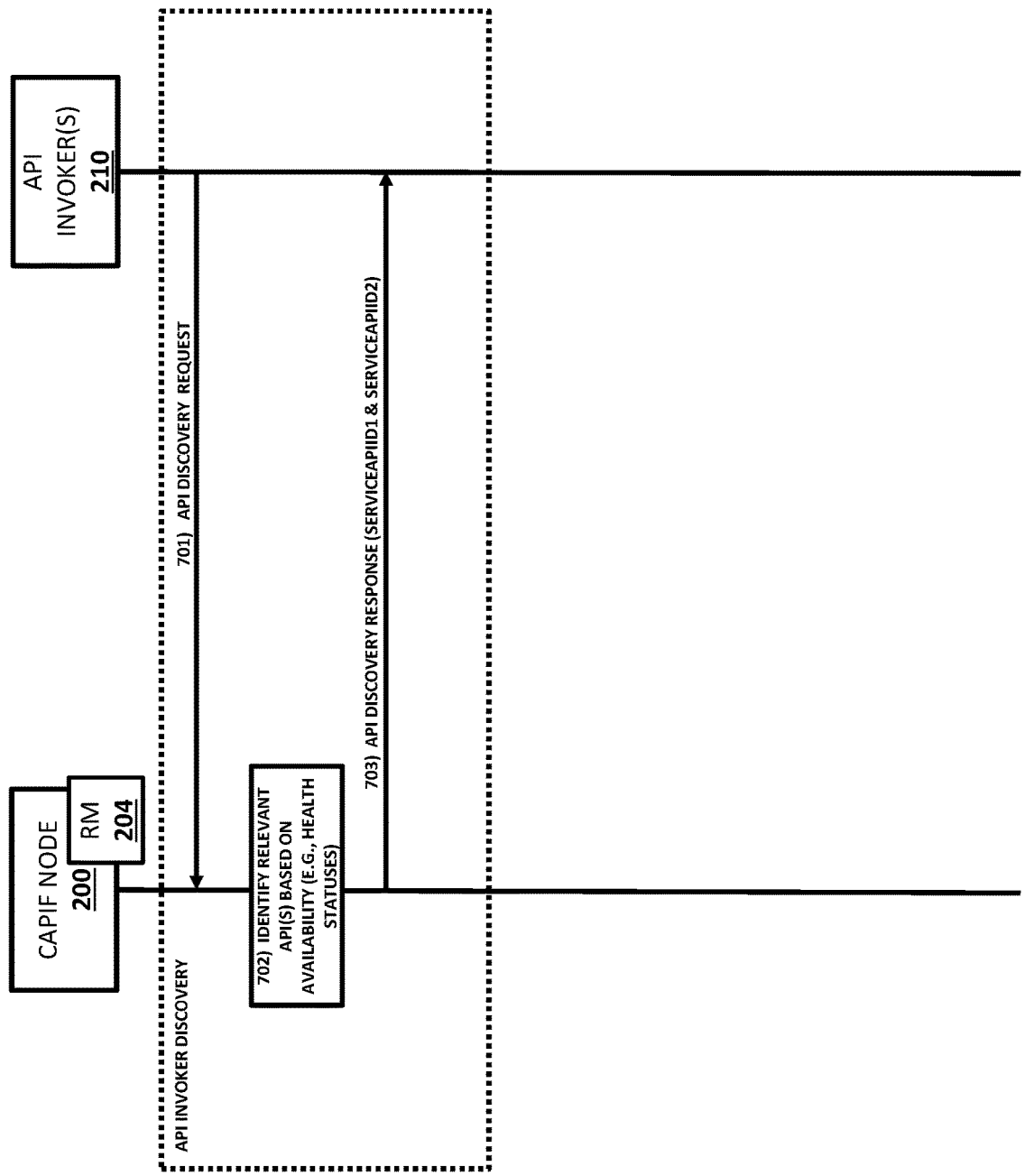
FIG. 7 is a message flow diagram illustrating an example API discovery procedure involving a CAPIF node.

FIG. 7 is a message flow diagram illustrating an example API discovery process involving CAPIF node 200. In some embodiments, CAPIF node 200 or RM 204 therein may support a Discover Service API (e.g., as defined in 3GPP TS 29.222) for allowing API invoker(s) 208 (e.g., AF 106) to discover available or relevant service APIs or related endpoints via CAPIF node 200. For example, after receiving an API discovery request message from an API invoker, CAPIF node 200 may provide one or more service API IDs and/or related information indicating APIs or related endpoints available to API invoker(s) 208.

In some embodiments, CAPIF node 200 or RM 204 therein may be configured to identify, select, or provide APIs or related endpoints that are considered active based on health statuses or related information, e.g., tracked and/or stored at or by CAPIF node 200. For example, in response to receiving an API discovery request message requesting all service APIs, CAPIF node 200 or RM 204 therein may identify a group of potential API IDs (e.g., ApfIds) that match the request (e.g., based on request parameters such as an NF set, a locality, or an NF type), may then remove one or more API IDs from the group of potential API endpoints if their corresponding health statuses are "inactive" (e.g., unavailable or offline), and may then provide information about the remaining API IDs (e.g., the "active" API IDs) in an API discovery response message.

Referring to FIG. 7, in step 701, an API discovery request message (e.g., an HTTP GET message) for requesting all service APIs (or IDs thereof) at CAPIF node 200 may be sent from API invoker(s) 210 to CAPIF node 200.

In step 702, CAPIF node 200 may receive the API discovery request message and identify relevant API(s) or related endpoints using corresponding health statuses and/or other information. For example, in response to receiving an API discovery request message, CAPIF node 200 or RM 204 therein may use API discovery related logic and stored health related information (e.g., ApfIDs, API information, and health statuses) to create a list of potential APIs (or related endpoints) (e.g., a list of API IDs) for responding to the discovery service request, may remove APIs (or related endpoints) that are currently associated with "inactive" (e.g., unavailable) health statuses, and may generate an API discovery response message indicating the remaining APIs (or related endpoints), e.g., the response may include one or more API IDs or ApfIds.

In step 703, an API discovery response message (e.g., an HTTP 200 OK message) indicating all relevant and available APIs (or related endpoints) may be sent from CAPIF node 200 to API invoker(s) 210.

It will be appreciated that FIG. 7 is for illustrative purposes and that different and/or additional messages than those depicted in FIG. 7 may be communicated and/or different and/or additional actions than those depicted in FIG. 7 may be performed. It will also be appreciated that various messages and/or actions described herein may occur in a different order or sequence.

Figure 8:
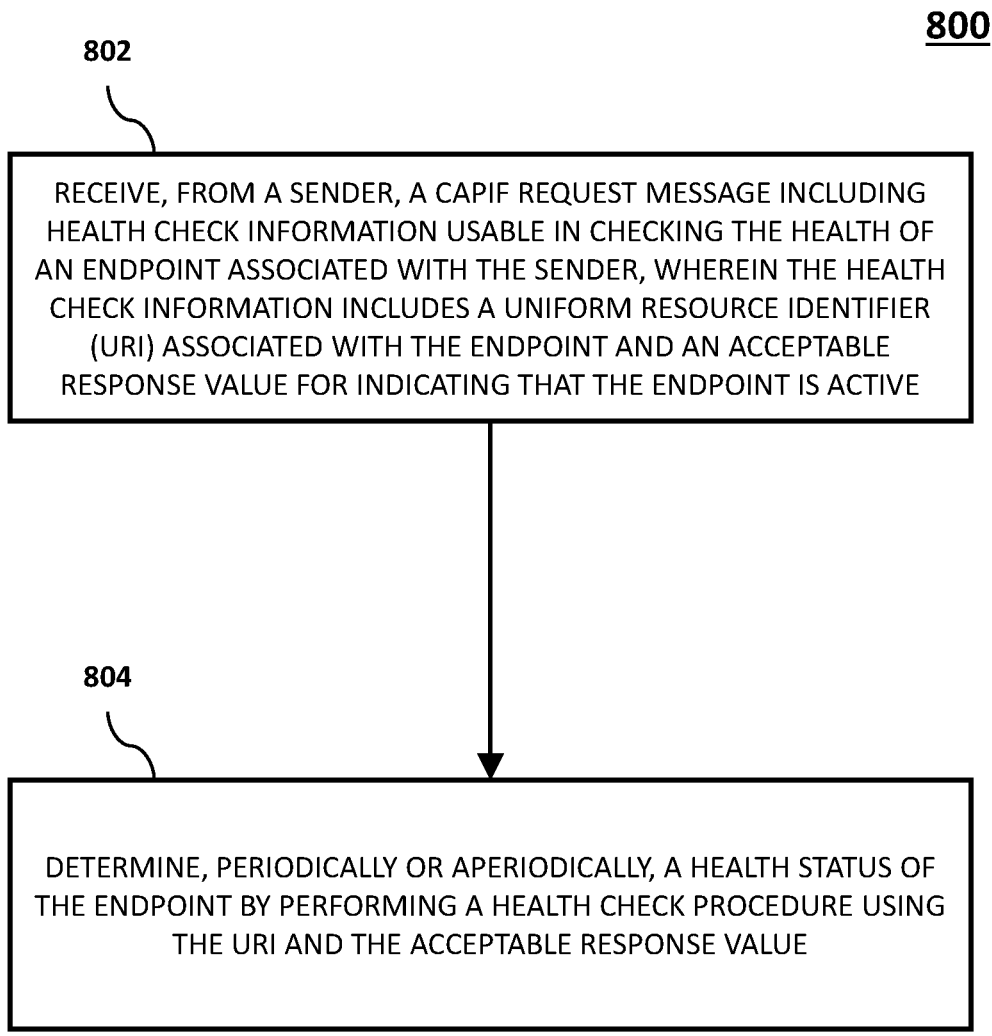
FIG. 8 is a flow chart illustrating an example process for health checking using CAPIF.

FIG. 8 is a diagram illustrating an example process 800 for health checking using CAPIF. In some embodiments, example process 800 described herein, or portions (e.g., operations or steps) thereof, may be performed at or performed by CAPIF node 200, RM 204, and/or a module or node.

Referring to process 800, in step 802, a CAPIF request message (e.g., an HTTP POST message) including health check information usable in performing a health check associated with a sender may be received from the sender (e.g., service provider(s) 208 or API invoker(s) 210), where the health check information includes a URI identifying an endpoint associated with the endpoint and an acceptable response value for indicating that the endpoint is active. For example, service provider(s) 208 may send a CAPIF request message to CAPIF node 200 for registering or publishing one or more service APIs or related endpoints. In another example, API invoker(s) 210 may send a CAPIF request message to CAPIF node 200 for onboarding one or more related endpoints.

In step 804, a health status of the endpoint associated with the sender may be periodically or aperiodically determined by performing a health check procedure that uses the URI and the acceptable response value.

In some embodiments, performing a health check procedure for a given endpoint may include sending, using a URI associated with the endpoint (e.g., as indicated in step 802), a health check message for triggering a response message that includes an acceptable response value (e.g., as indicated in step 802) if the endpoint is active.

In some embodiments, performing a health check procedure for a given endpoint may include receiving a response message; determining that the response message lacks an acceptable response value (e.g., provided in step 802); and determining and/or indicating that the endpoint is inactive.

In some embodiments, performing a health check procedure for a given endpoint may include determining that a response message was not received within a time period (e.g., configured by a network operator); and determining and/or indicating that the endpoint is inactive.

In some embodiments, performing a health check procedure for a given endpoint may include receiving a response message; determining that the response message includes an acceptable response value (e.g., as indicated in step 802); and determining and/or indicating that the endpoint is active.

In some embodiments, CAPIF node 200, RM 204, or another entity may be configured for, in response to a health status changing from active to inactive, generating and storing a timestamp associated with the health status change.

In some embodiments, CAPIF node 200, RM 204, or another entity may be configured for performing a resource cleanup procedure, wherein performing the resource cleanup procedure includes identifying, using timestamps and health statuses, inactive endpoints that have been inactive for at least a predetermined amount of time and deleting information associated with the inactive endpoints.

In some embodiments, CAPIF node 200, RM 204, or another entity may be configured for performing an API discovery procedure including excluding, using timestamps and health statuses, inactive endpoints that have been inactive for at least a predetermined amount of time from a set of APIs or endpoints provided in a response message to an API discovery request message. For example, in response to receiving an API discovery request message, CAPIF node 200, RM 204, or another entity may remove one or more inactive endpoints from consideration (initially or in a later stage of an API discovery procedure) if these endpoints are deemed inactive for a configurable time period or longer (even if otherwise these endpoints would be relevant based on the API discovery request message).

In some embodiments, CAPIF node 200 may include a CCF or an AEF.

It will be appreciated that process 800 is for illustrative purposes and that different and/or additional messages may be communicated and/or actions may be performed. It will also be appreciated that various messages and/or actions described herein may occur in a different order or sequence.

It will be appreciated that while some aspects of the subject matter described herein has been discussed with reference to 5G networks various other networks may utilize some aspects of the subject matter described herein. For example, any network that allows or utilizes CAPIF node or CAPIF node-like functions may use features, systems, mechanisms, and/or techniques described herein to perform endpoint health checks (e.g., availability checks), notify subscribed entities about changes in endpoint availability, and/or cleanup resources (e.g., delete stored endpoint information associated with service provider(s) 208 and/or API invoker(s) 210). In this example, health statuses (or other information) derived from endpoint health checks can be utilized for mitigating issues associated with storing or using stale endpoint information and/or for improving CAPIF related memory utilization.

It should be noted that CAPIF node 200, RM 204, and/or functionality described herein may constitute a special purpose computing device. Further, CAPIF node 200, RM 204, and/or functionality described herein can improve the technological field of network communications. For example, CAPIF node 200 may include RM 204 and may be capable of performing health checks (e.g., dynamically or periodically) for one or more endpoints registered or stored at or by CAPIF node 200. In this example, service provider(s) 208 and/or API invoker(s) 210 may provide health check information for indicating to CAPIF node 200 or RM 204, where the provided health check information may indicate which endpoints are to receive health check messages, where to send health check messages, and/or how to analyze or interpret health check response messages. Continuing with this example, CAPIF node 200 or RM 204 may use health statuses (or other information) derived from health checks in performing various actions, e.g., performing resource cleanup for endpoints that are deemed inactive for a particular amount of time or notifying subscribed entities about service API endpoints being available or unavailable.

The disclosure of each of the following references is incorporated herein by reference in its entirety to the extent not inconsistent herewith and to the extent that it supplements, explains, provides a background for, or teaches methods, techniques, and/or systems employed herein.

REFERENCES:

1. 3GPP TS 23.222; 3rd Generation Partnership Project; Technical Specification Group Services and System Aspects; Functional architecture and information flows to support Common API Framework for 3GPP Northbound APIs; Stage 2 (Release 16); V16.10.0 (2021-06).
2. 3GPP TS 29.222; 3rd Generation Partnership Project; Technical Specification Group Core Network and Terminals; Common API Framework for 3GPP Northbound APIs; (Release 16); V16.7.0 (2021-06).
3. 3GPP TS 29.510; 3rd Generation Partnership Project; Technical Specification Group Core Network and Terminals; 5G System; Network Function Repository Services; Stage 3 (Release 16); V16.9.0 (2021-09).
4. 3GPP TS 29.522; 3rd Generation Partnership Project; Technical Specification Group Core Network and Terminals; 5G System; Network Exposure Function Northbound APIs; Stage 3 (Release 16); V16.9.0 (2021-09).

5. 3GPP TS 29.122; 3rd Generation Partnership Project; Technical Specification Group Core Network and Terminals; T8 reference point for Northbound APIs; (Release 16); V16.11.0 (2021-09).
6. 3GPP TS 29.500; 3rd Generation Partnership Project; Technical Specification Group Core Network and Terminals; 5G System; Technical Realization of Service Based Architecture; Stage 3 (Release 16); V16.9.0 (2021-09).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for health checking involving common application programming interface (API) framework (CAPIF), the method comprising:
   at a CAPIF node including at least one processor:
      receiving, from a sender, a CAPIF request message including health check information usable in checking the health of an endpoint associated with the sender, wherein the health check information includes a uniform resource identifier (URI) associated with the endpoint and an acceptable response value for indicating that the endpoint is active; and
      determining, periodically or aperiodically, a health status of the endpoint by performing a health check procedure using the URI and the acceptable response value.

2. The method of claim 1 wherein performing the health check procedure includes sending, using the URI, a health check message for triggering a response message that includes the acceptable response value if the endpoint is active.

3. The method of claim 2 comprising:
   receiving the response message;
   determining that the response message lacks the acceptable response value; and
   indicating that the endpoint is inactive.

4. The method of claim 2 comprising:
   determining that the response message was not received within a time period; and
   indicating that the endpoint is inactive.

5. The method of claim 2 comprising:
   receiving the response message;
   determining that the response message includes the acceptable response value; and
   indicating that the endpoint is active.

6. The method of claim 1 comprising:
   in response to the health status changing from active to inactive, generating and storing a timestamp associated with the health status change.

7. The method of claim 1 comprising:
   performing a resource cleanup procedure including identifying, using timestamps and health statuses, inactive endpoints that have been inactive for at least a predetermined amount of time and deleting information associated with the inactive endpoints.

8. The method of claim 1 comprising:
   performing an API discovery procedure including excluding, using timestamps and health statuses, inactive endpoints that have been inactive for at least a predetermined amount of time from a set of APIs or endpoints provided in a response message to an API discovery request message.

9. The method of claim 1 wherein the CAPIF request message is a message for registering one or more service APIs and the sender is a service provider or the CAPIF request message is a message for onboarding an API invoker and the sender is the API invoker; or wherein the CAPIF node includes a CAPIF core function (CCF) or an API exposing function (AEF).

10. A system for health checking involving common application programming interface (API) framework (CAPIF), the system comprising:
    at least one processor;
    a memory; and
    a CAPIF node including the at least one processor and the memory, the CAPIF node configured for:
       receiving, from a sender, a CAPIF request message including health check information usable in checking the health of an endpoint associated with the sender, wherein the health check information includes a uniform resource identifier (URI) associated with the endpoint and an acceptable response value for indicating that the endpoint is active; and
       determining, periodically or aperiodically, a health status of the endpoint by performing a health check procedure using the URI and the acceptable response value.

11. The system of claim 10 wherein performing the health check procedure includes sending, using the URI, a health check message for triggering a response message that includes the acceptable response value if the endpoint is active.

12. The system of claim 11 wherein performing the health check procedure further includes:
    receiving the response message;
    determining that the response message lacks the acceptable response value; and
    indicating that the endpoint is inactive.

13. The system of claim 11 wherein performing the health check procedure further includes:
    determining that the response message was not received within a time period; and
    indicating that the endpoint is inactive.

14. The system of claim 11 wherein performing the health check procedure further includes:
    receiving the response message;
    determining that the response message includes the acceptable response value; and
    indicating that the endpoint is active.

15. The system of claim 10 wherein the CAPIF node is configured for:
    in response to the health status changing from active to inactive, generating and storing a timestamp associated with the health status change.

16. The system of claim 10 wherein the CAPIF node is configured for:
    performing a resource cleanup procedure including identifying, using timestamps and health statuses, inactive endpoints that have been inactive for at least a predetermined amount of time and deleting information associated with the inactive endpoints.

17. The system of claim 10 wherein the CAPIF node is configured for:
    performing an API discovery procedure including excluding, using timestamps and health statuses, inactive endpoints that have been inactive for at least a predetermined amount of time from a set of APIs or endpoints provided in a response message to an API discovery request message.

18. The system of claim 10 wherein the CAPIF request message is a message for registering one or more service APIs and the sender is a service provider or the CAPIF request message is a message for onboarding an API invoker and the sender is the API invoker.

19. The system of claim 10 wherein the sender is a service provider or an API invoker or wherein the CAPIF node includes a CAPIF core function (CCF) or an API exposing function (AEF).

20. A non-transitory computer readable medium having stored thereon executable instructions that when executed by at least one processor of a computer cause the computer to perform steps comprising:

at a common application programming interface (API) framework (CAPIF) node including at least one processor:

receiving, from a sender, a CAPIF request message including health check information usable in checking the health of an endpoint associated with the sender, wherein the health check information includes a uniform resource identifier (URI) associated with the endpoint and an acceptable response value for indicating that the endpoint is active; and determining, periodically or aperiodically, a health status of the endpoint including performing a health check procedure using the URI and the acceptable response value.

\* \* \* \* \*

UNITED STATES PATENT AND TRADEMARK OFFICE
CERTIFICATE OF CORRECTION

PATENT NO. : 11,709,725 B1
APPLICATION NO. : 17/579077
DATED : July 25, 2023
INVENTOR(S) : Krishan et al.

It is certified that error appears in the above-identified patent and that said Letters Patent is hereby corrected as shown below:

In the Specification

In Column 12, Line 59-60, Delete "API invoker(s) 210 or related endpoints that are inactive for at least the last five minutes." and insert the same on Column 12, Line 58, after "involving" as a continuation of the same paragraph.

In Column 14, Line 62, Delete "CAP_IF" and insert -- CAPIF --, therefor.

Signed and Sealed this
Fourth Day of June, 2024

Katherine Kelly Vidal
*Director of the United States Patent and Trademark Office*